April 23, 1940.    F. C. REGGIO    2,198,273
POWER TRANSMISSION MECHANISM
Filed Oct. 27, 1937    5 Sheets-Sheet 1
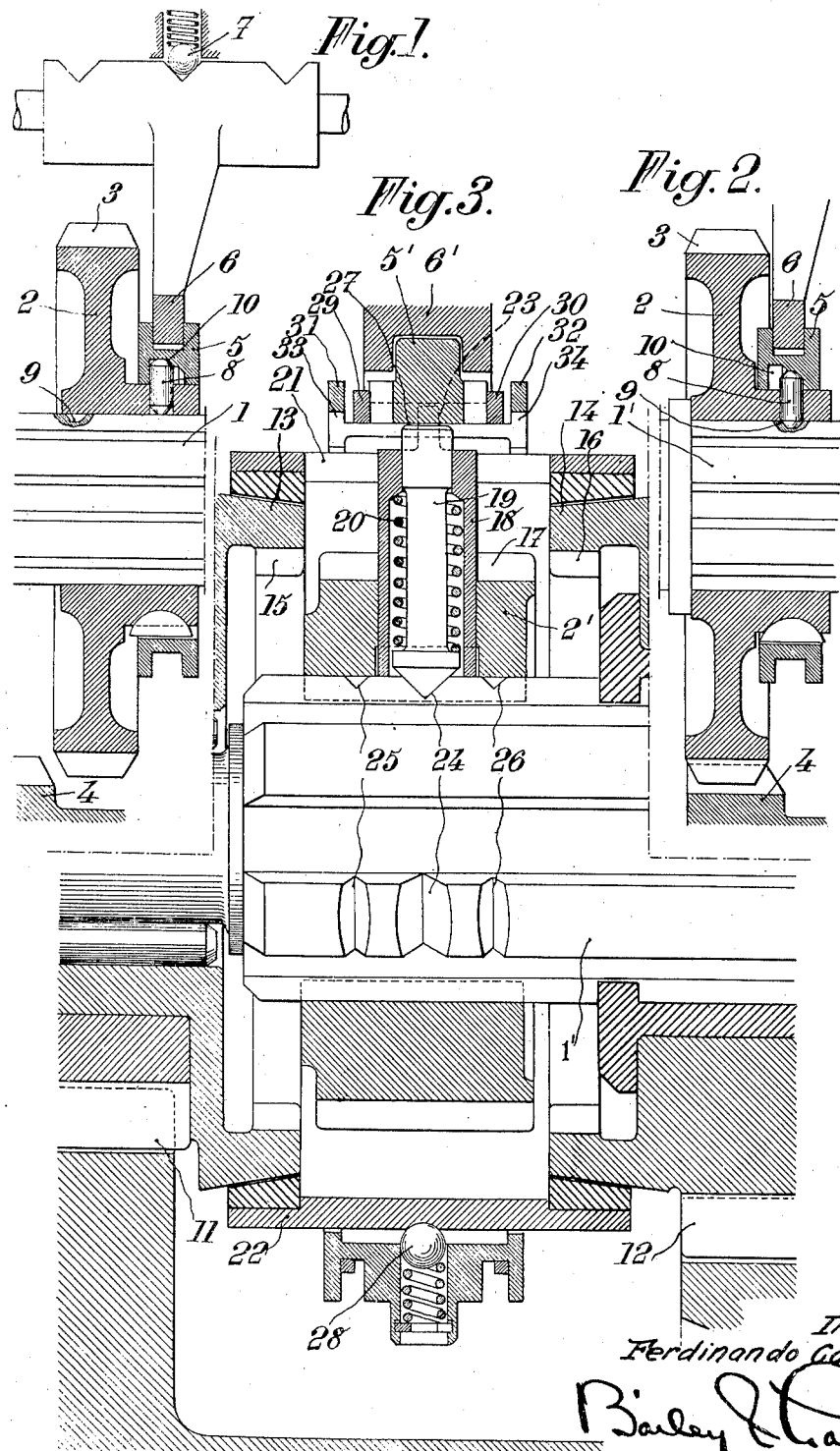
Inventor:
Ferdinando Carlo Reggio,
Attorneys

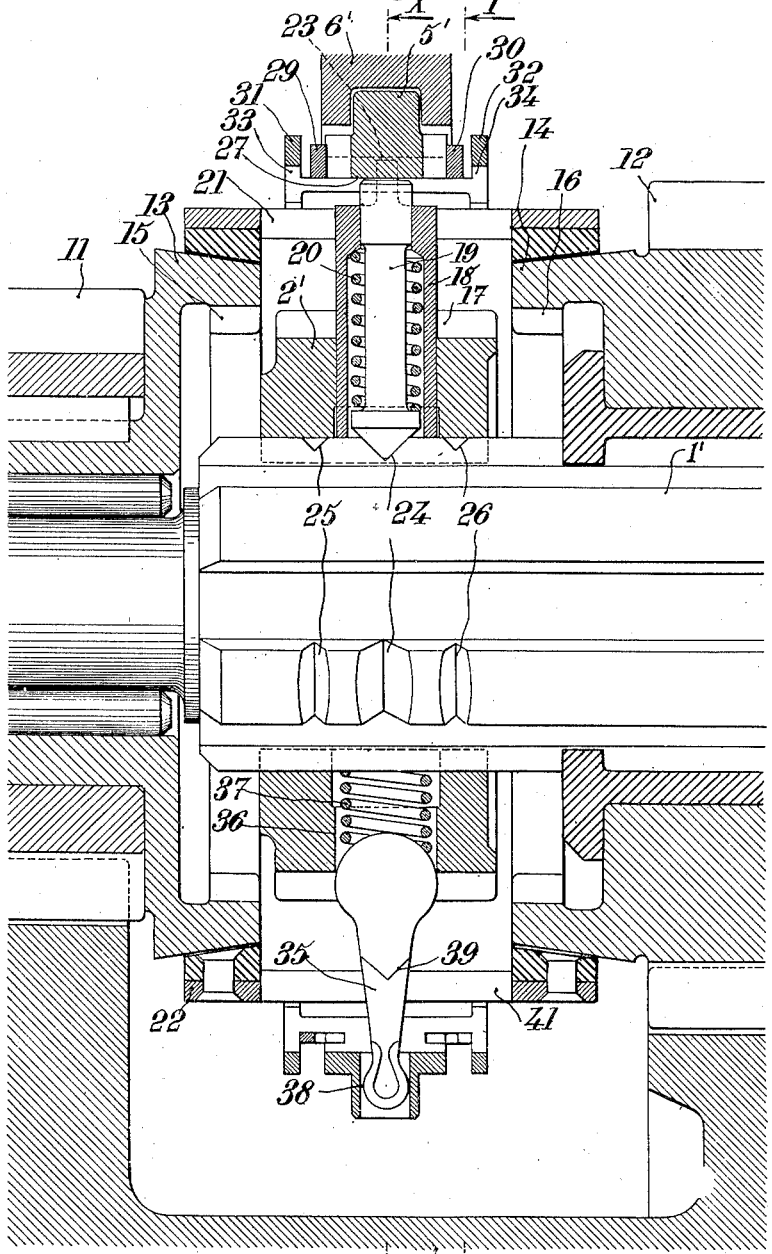

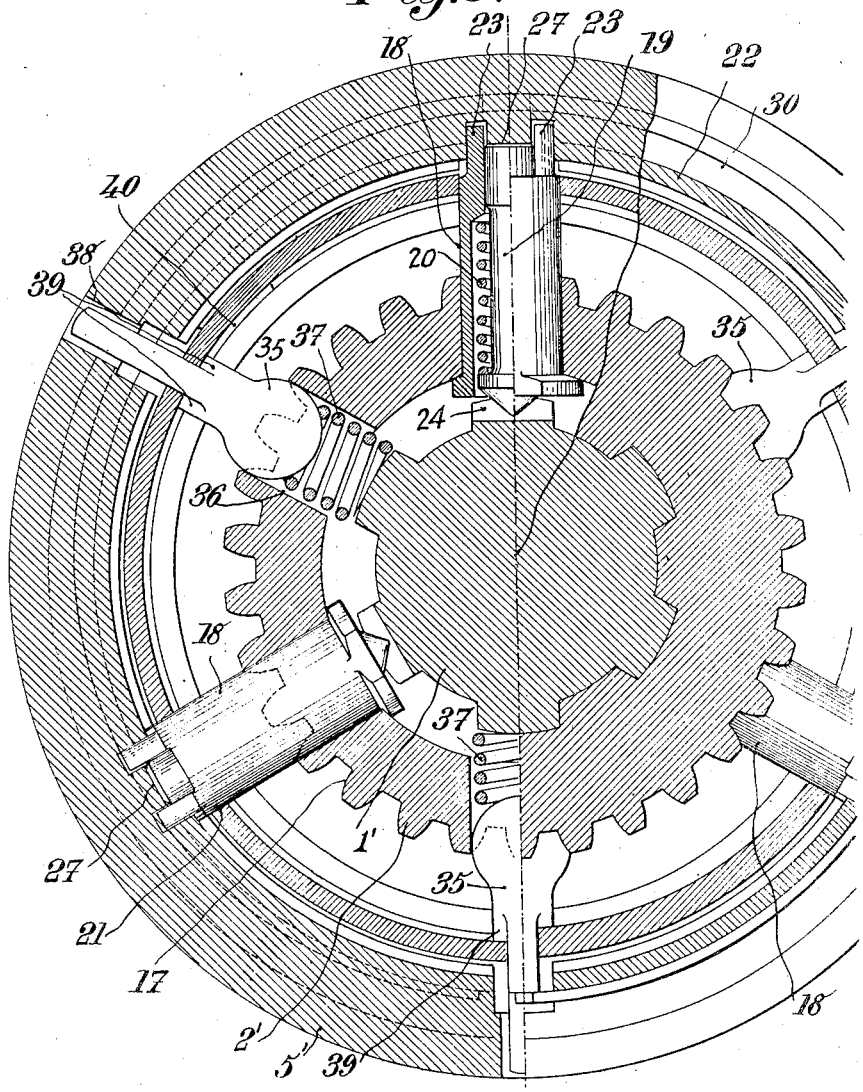

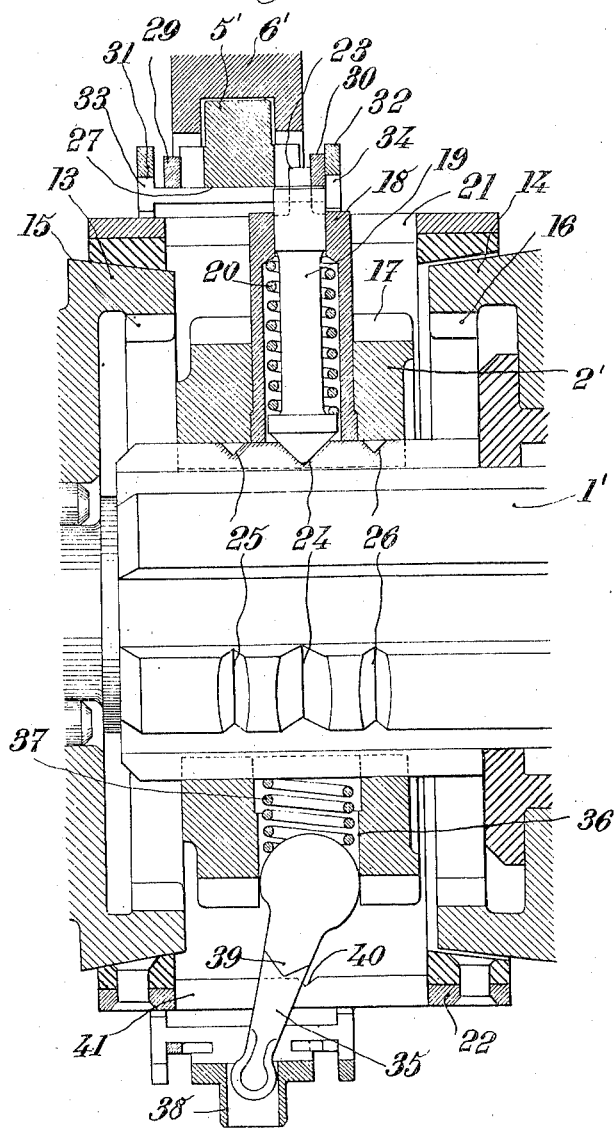

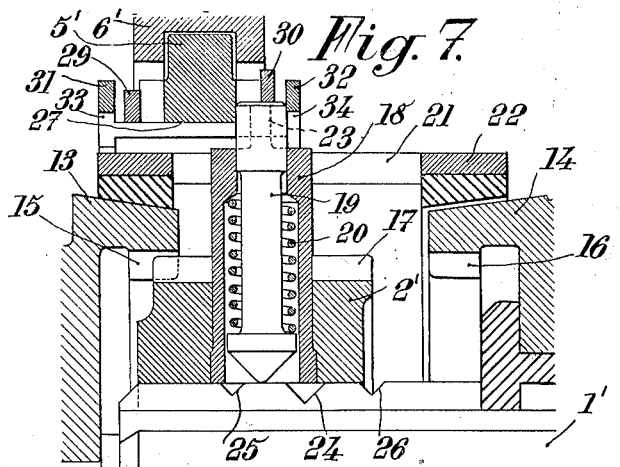
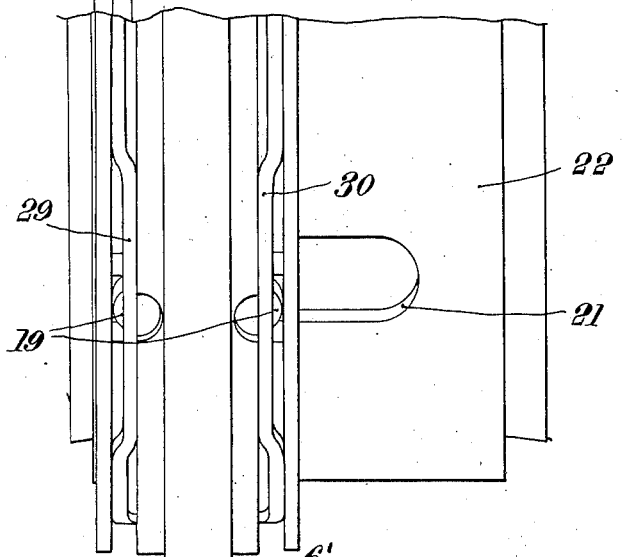
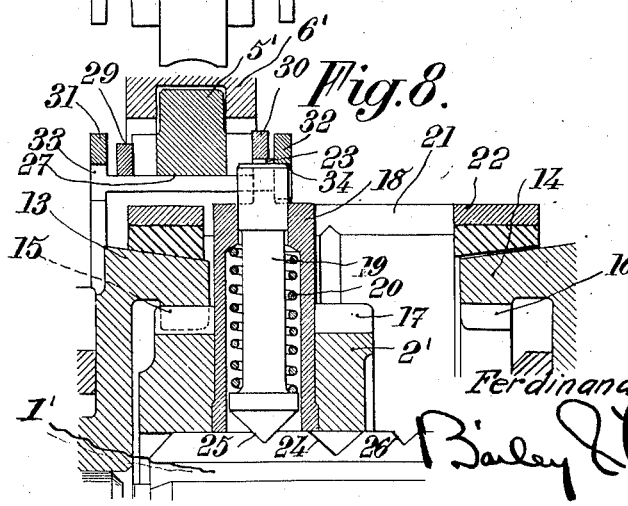

Patented Apr. 23, 1940

2,198,273

UNITED STATES PATENT OFFICE 2,198,273

POWER TRANSMISSION MECHANISM

Ferdinando Carlo Reggio, Buffalo, N. Y.

Application October 27, 1937, Serial No. 171,374
In Belgium October 30, 1936

15 Claims. (Cl. 192—53)

The present invention relates to coupling devices including a sliding gear, that is to say including a member capable of sliding with respect to a first rotating element in order to couple this element, either indirectly, by meshing, or directly, by dog clutch engagement, with another rotating element the axis of which is either parallel with the axis of the first mentioned element or in line therewith. The invention is more especially, although not exclusively, concerned with devices of this kind for use in connection with variable ratio transmissions, for instance gear boxes for automobile vehicles.

The object of the present invention is to provide a device of this kind which is better adapted to meet the requirements of practice, and in particular which avoids the risks of accidental breaking of the engagement between the elements to be coupled together.

The essential feature of the present invention consists in providing devices of the kind above referred to with means for the control of the sliding gear consisting in an intermediate element capable of sliding with respect to said sliding gear and adapted to interconnect the sliding gear, the rotating element that carries it and said intermediate element through locking means such that the sliding gear is locked to the rotating element that carries it during the time for which the intermediate element is kept in the position corresponding to transmission of movement from one element to the other.

Other features of the present invention will result from the following detailed description of some specific embodiments thereof.

Preferred embodiments of the present invention will be hereinafter described, with reference to the accompanying drawings, given merely by way of example, and in which:

Fig. 1 is an axial sectional view of a device including a sliding gear for the coupling, by means of intermeshing pinions, of two parallel shafts, the movable pinion being shown in neutral position;

Fig. 2 is a view similar to Fig. 1, showing the same device, with the parts thereof in the position corresponding to the meshing of the movable pinion;

Fig. 3 is an axial sectional view of a coupling device including a sliding gear, for coupling by dog-clutch engagement a shaft with either of two rotating elements coaxial therewith, the dog-clutch sliding member being shown in neutral position;

Fig. 4 is a view similar to Fig. 3, showing a similar device, which differs therefrom merely by a detail of construction;

Fig. 5 shows the device corresponding to Fig. 4 in transverse section, partly on the line X—X of Fig. 4, and partly on the line Y—Y of Fig. 4;

Fig. 6 shows, partly in axial section and partly in lateral view, the same device as Fig. 4 in a different relative position of the sliding member;

Fig. 7 is a partial axial section of the device of Fig. 4, for another position of said sliding member;

Fig. 8 is a view similar to Fig. 7 showing still another relative position of said sliding member.

In the following description, it will be supposed that it is desired to provide, according to the invention, a coupling device, of the type including a sliding gear, intended to be included in a gear box, for instance for an automobile vehicle.

I fit, on suitable splines of a shaft 1, a sliding member.

This sliding member may consist, as shown by Figs. 1 and 2, of a pinion 3 adapted to be brought into mesh or out of mesh with a second pinion 4 carried by a parallel shaft.

This sliding member 2 is associated with an element 5, for instance of annular shape, adapted to slide, with a predetermined amplitude of movement, with respect to said sliding member.

Sliding member 2, shaft 1 and element 5 are interconnected by a locking system such that the sliding member is locked with respect to shaft 1 for the whole time for which element 5 is kept in its position corresponding to the operative engagement of the parts.

Finally, I arrange the control means of the sliding member in such manner that, instead of acting directly thereon, these means act, through the intermediate of a fork or the like, 6, on element 5.

The locking system is itself arranged in such manner as to comply with the following conditions:

First, when the parts are in the relative positions corresponding to coupling engagement, sliding member 2 is locked with respect to shaft 1.

Furthermore, when fork 6 is acted upon in the direction tending to bring sliding member 2 from the coupling position into neutral position, the release of sliding member 2 from locked position takes place only after element 5 has been moved a certain distance, and, after this, sliding member 2 can be brought into its position corresponding to neutral.

It will be readily understood that, owing to such an arrangement, it suffices to provide a stopping ball or the like on the movable element carrying fork 6 for positively preventing sliding member 2 from moving out of coupling engagement as long as said fork has not been voluntarily displaced.

In the simple example illustrated by Figs. 1 and 2, in which element 5 is given the shape of a ring capable of sliding axially on a sleeve integral with sliding member 2, it is advantageous to constitute said locking system by a mere finger 8 adapted to slide radially in said ring and both ends of which are pointed. Suitable notches or housings 9 and 10 are provided respectively in shaft 1 and element 5 in such manner that, when one of said pointed ends is engaged in one of said recesses, its opposite end can slide along a wall adjacent to the other of said recesses.

With this arrangement, the following results are obtained:

On the one hand, sliding member 2 is locked on shaft 1 when fork 6 has been moved right to the end of its stroke in the direction corresponding to the coupling engagement of the parts;

On the other hand, element 5 is locked on sliding member 2 as long as the latter is not in its coupling position.

The invention can also be applied to the case where it is desired to be able to move element 5 a certain distance without producing any displacement of sliding member 2, when the latter occupies the neutral position, in such manner that the sliding member is in turn moved only after a given displacement of element 5 from its own neutral position has taken place.

Such an arrangement is particularly advantageous in the case of the coupling devices being provided with synchronizing means, in which case, in order to reduce the space occupied by the device in the longitudinal direction, it is advantageous to maintain sliding member 2 in a stationary position while element 5 is being moved from its neutral position into the position for which the friction elements of the synchronizing device come into action.

With this arrangement, a minimum displacement of the sliding member 2 is subsequently necessary for shifting the device into coupling position.

In order to carry out this arrangement, it is advantageous to provide, for the locking of sliding member 2 in its neutral position, a device of the kind of that disclosed in my copending application Serial No. 171,373, filed October 27, 1937, and, preferably, this device will be combined with that intended to ensure the locking of the sliding member in its coupling position (or positions).

If it is desired, for instance, to provide a device complying with the conditions above set forth, in order to obtain at will the coupling of a shaft 1' either with a pinion 11, or with a pinion 12, these two pinions being coaxial with said shaft and freely rotatable with respect thereto, it is advantageous to make use of the arrangement which will now be described with reference to Figs. 3 to 8. In these figures, the elements corresponding to those of Figs. 1 and 2 have the same reference characters with prime indicia.

In this embodiment of the invention, each of the pinions 11 and 12 is provided, on either side of the space in which the sliding member 2' is to move, with a cylindrical edge 13, 14, these two edges being preferably of the same size.

The external face of each of these two edges is given a frusto-conical shape, so that said edges can be used as friction elements for the synchronizing device.

The internal faces of said elements are provided with teeth 15, 16, capable of coming into mesh with the teeth 17 provided on the outer periphery of sliding member 2', the whole being devised in such manner that, according as said sliding member is moved toward the right or toward the left from its neutral position (Fig. 3) said teeth 17 come into mesh with one or the other of teeth 15, 16.

Sliding member 2' is provided with a plurality of radial guides 18 (for instance three disposed at 120° from one another) in which guides are disposed locking pins or fingers 19 having pointed ends pushed toward shaft 1' by respective springs 20.

These guides 18 are prolonged outwardly a distance sufficient for allowing them to engage in longitudinal slots 21 provided in a sleeve 22 surrounding both the sliding member 2' and the friction elements carried by edges 13, 14. On the other hand, this sleeve is provided, along its edges, with other friction elements, of a shape corresponding to that of those just above mentioned.

I fit in a slidable manner about said sleeve 22 an annular element 5', coacting with fork 6' and preferably guided by the latter in such manner as to be maintained in parallel relation to itself. This annular element is prevented from turning with respect to sleeve 22 and to sliding member 2' by the engagement in longitudinal grooves of annular element 5' of fingers 23, carried by guides 18 on either side of locking pins 19, said fingers projecting to a distance of the axis of revolution at least equal to the distance from said shaft at which are located the external ends of pins 19 when their pointed inner ends are in contact with the external face of shaft 1'.

I provide, in this external face, in register with the positions that the pointed ends of locking pins 19 are called upon to occupy, on the one hand for neutral position and, on the other hand, for each of the coupling positions, three series of recesses 24, 25, 26, complying with the conditions hereinafter indicated.

Element 5' is provided, opposite each locking pin 19, with a median abutment 27 capable, as long as element 5' remains in its central position (Fig. 3) of preventing the corresponding locking pin 19 from leaving the notch 24 in which it is engaged. It is thus possible to displace element 5' on either side of its central position without sliding member 2' being driven together with said element, and this displacement is sufficient for producing a displacement of sleeve 22 (which has been connected with element 5', in the embodiment illustrated by Fig. 3, by at least one stopping ball 28) which is sufficient for bringing the friction elements into contact with one another before the positive engagement of sliding member 2' with either of the parts 15 and 16, so that said sliding member is first given a speed of revolution equal to that of said parts.

But it is necessary that, once synchronization has been obtained, after a supplementary displacement intended to make allowance for play and wear and tear, element 5' should in turn drive sliding member 2'.

For this purpose, abutments 27 are made of a width such that the outer ends of locking pins 19 may be disengaged from said abutments after a sufficient displacement of element 5'. If then an abutment acted in such manner as to limit the displacement of element 5' with respect to sliding member 2', the operating effort would produce the disengagement of locking pins 19 from notches 24 and the subsequent further displacement of element 5' would produce the engagement of the teeth.

But, with such an arrangement, no means would be provided for the locking of the sliding member in its position of coupling engagement. Therefore, in order to provide these means, the system just above described is completed as it will be hereinafter described.

I provide, on either side of the median abutment 27, in two external annular grooves provided in element 5', two movable abutments 29, 30, elastically urged, on the one hand toward each other, and, on the other hand, toward the axis of the whole, these abutments being preferably of a thickness corresponding to the difference existing between the width of fingers 23 and one half of the width of the outer ends of locking pins 19.

Advantageously, the movable abutments consist of elastic segments disposed in said annular grooves and prevented from turning with respect to element 5', these segments being preferably of the shape shown by the lower part of Fig. 7, that is to say an undulated shape such that they have alternate portions applied against the two walls of the grooves in which they are inserted, respectively.

In any case, I provide, in order to limit the displacement of these movable abutments in the direction of the lateral faces of element 5', flanges 31, 32, limiting said annular grooves on the respective outer sides thereof, these flanges being located at a distance from the end walls of abutment 27 at least equal to the width of the outer ends of locking pins 19.

Thus, when element 5' is moved in a given direction until the locking pins escape from abutment 27, fingers 23 push back the movable abutments 29 or 30 to the end of their stroke (Fig. 6). The locking pins can then move upwardly in their respective guides under the effect of the oblique thrust exerted by the walls of notch 24, and, in the course of this upward displacement, they push back movable abutments 29 or 30 which move away from the corresponding flange 31 or 32 and pass above fingers 23 (Fig. 7). Their outer ends then reach a level such that they abut externally against the flange 31 or 32 to which they are juxtaposed. Thus element 5' can then drive, through the intermediate of locking pins 19, sliding member 2' until the latter reaches its coupling position.

At this time, locking pins 19 can move down slightly by engaging into the notches 25 or 26 corresponding to the active or coupling position of the device. Their outer ends can thus escape to the abutment that was constituted for them by said flange 31 or 32, notches 33, 34 having been provided for this purpose in flanges 31 and 32.

It will be readily understood that it is then possible to give element 5' a slight further displacement (Fig. 8), limited by the contact of the inner edge of element 5' with guide 18, which is sufficient for bringing above the outer ends of locking pins 19 the edge of the corresponding recesses 33 or 34. Locking pins 19 are thus fixed in engagement in notches 25 or 26.

Of course, the operation which results from the above description takes place in the reverse order when element 6' is itself moved in the reverse direction, and the same operations take place whatever be the direction in which element 5' has been displaced from its median position.

In the preceding description it has been supposed that, as shown by Fig. 3, sleeve 22 was connected to element 5' through a stopping ball 28.

It will be understood that the interconnection of these two parts might be obtained through any other suitable means, and, in particular, through the means described in my copending U. S. application of even date above referred to. Such means permit of obtaining, for a given thrust applied to element 6', a multiplied thrust on the friction elements during the synchronization period. These means may include any elements capable of giving this multiplying action, such for instance as cams, wedges or preferably levers.

An embodiment of the present invention including such means has been shown in Figs. 4 to 7 of the drawings. This device is based upon the use of radial levers, such as 35, arranged as follows:

The inner end of each of them is engaged in a radial hole 36 provided in sliding member 2', with the interposition of a spring 37 tending to push out this end from said hole.

The outer end of each of these levers is engaged in a radial hole 38 provided in element 5'.

Furthermore, these levers are provided, on both of their faces, with bosses 39 adapted to engage in recesses or notches 40 provided on the inner face of sleeve 22, on either side of slots 41 through which said levers 35 extend across said sleeve 22.

Such a mechanism gives exactly the same result as that including stopping balls 28 shown by Fig. 3. However, it has the advantage that the effort transmitted to the friction elements is higher than that applied to element 5', as a consequence of the provision of levers 35 which multiply this effort in proportion of the ratio of the lever arms.

Thus, in any case, whatever be the embodiment that is chosen, I obtain a system the advantages of which result sufficiently clearly from the preceding explanations for making it unnecessary to enter, on their account, into supplementary explanations.

In a general manner, while I have, in the above description, disclosed what I deem to be practical and efficient embodiments of the present invention, it should be well understood that I do not wish to be limited thereto, as there might be changes made in the arrangement, disposition, and form of the parts without departing from the principle of the present invention as comprehended within the scope of the accompanying claims.

What I claim is:

1. A mechanical transmission device which comprises, in combination, two rotatable elements having parallel axes, a positive coupling member angularly fixed to one of said elements and axially slidable thereon so as to be able to come into cooperative engagement with the other rotatable element for interconnecting these two rotatable elements, a control member, an intermediate element operative by said control member and axially slidable with respect to said sliding coupling member, temporary locking means between said intermediate element and said sliding member whereby said sliding member can be brought by said intermediate element into and out of engagement with the second mentioned rotatable element, and locking means between said sliding member and the rotatable element that carries it, operative by said intermediate element, for interlocking said sliding member and the rotatable element that carries it in the relative positions corresponding to engagement or disengagement of said rotatable elements when said intermediate element is in the position corresponding to coupling engagement of the parts or in the position corresponding to disengagement of said parts respectively.

2. A mechanical transmission device which comprises, in combination, two coaxial rotatable elements, a positive coupling member angularly fixed to one of said elements and axially slidable thereon so as to be able to come into cooperative engagement with the other rotatable element for interconnecting these two rotatable elements, said slidable coupling member having a clutched and an unclutched position, a control member, an intermediate element operative by said control member and axially slidable with respect to said sliding coupling member, said intermediate element having a position corresponding to engagement of said elements and a neutral position, locking means adapted to coact with said sliding member, the rotatable element that carries it, and said intermediate element, for axially locking said sliding member with said intermediate element when said intermediate element is between said neutral position and said position corresponding to engagement of said elements, and locking said sliding member with respect to said first mentioned rotatable element in said clutched or unclutched position when said intermediate element is in the position corresponding to the coupling engagement of the parts or in said neutral position respectively.

3. A mechanical transmission device which comprises, in combination, two rotatable elements having parallel axes, an axially slidable positive coupling member angularly fixed around a portion of one of said rotatable elements and having a clutched position and an unclutched position, a control member, an intermediate element operative by said control member and angularly fixed around said sliding member, said intermediate element being axially slidable on said sliding member and having a neutral position and a position corresponding to engagement of said rotatable elements, said sliding member being provided with radial holes, locking pins slidably engaged in said holes so as to be able to project on the inside or the outside thereof, housings provided in said intermediate element for the outer ends of said locking pins, axially spaced first and second housings in said first mentioned rotatable element adapted to be engaged by the inner ends of said locking pins when said slidable coupling member is in said clutched or in said unclutched position respectively, and means for forcing said locking pins into said first or second housings of said first mentioned rotatable element when said intermediate element is in the position corresponding to the coupling engagement of the parts or in said neutral position respectively.

4. A mechanical transmission device which comprises, in combination, two rotatable elements having parallel axes, a positive coupling member angularly fixed coaxially around a portion of one of said rotatable elements and axially slidable thereon so as to be able to come into cooperative engagement with the other rotatable element for interconnecting these two rotatable elements, a control member, an intermediate element operative by said control member angularly fixed around said sliding member and axially slidable thereon, said sliding member being provided with axial holes extending throughout it, locking pins slidably engaged in said holes and of a length greater than that of said holes so that at least one end of each of said locking pins always projects from said sliding member, either inwardly or outwardly, both ends of each of said locking pins being of tapered shape, housings for the ends of said locking pins being provided in the inner wall of said intermediate element and the outer wall of said portion of the first mentioned rotatable element, for the respective outer and inner ends of said pins, the housings provided in said intermediate element having a notched portion of a shape corresponding to that of the outer ends of said locking pins and of a depth such that, when the locking pins are engaged therein, their inner ends are flush with the outer surface of the first mentioned rotatable element, and a surface, adjacent to said notches and parallel to the axis of the system to a distance therefrom such that when the locking pins are in contact therewith through their outer ends, their inner ends are forced inwardly into the corresponding housings of said first mentioned rotatable element, said outer ends of the locking pins being adapted to come into contact with said surface of the housings of the intermediate element when said intermediate element is being brought into the axial position thereof corresponding to coupling engagement of the parts.

5. A mechanical transmission device which comprises, in combination, two rotatable elements having parallel axes, a positive coupling member angularly fixed around a portion of one of said rotatable elements and axially slidable thereon so as to be able to come into cooperative engagement with the other rotatable element for interconnecting these two rotatable elements, a control member having a neutral position, an intermediate element operative by said control member angularly fixed around said sliding member and axially slidable thereon, locking means adapted to coact with said sliding member, the rotatable element that carries it, and said intermediate element, for axially interconnecting said sliding member with said intermediate element after said intermediate element has moved a certain distance from its neutral position and before it has brought said sliding member into a position corresponding to coupling engagement of the parts, and locking said sliding member with respect to the rotatable element that carries it, in the axial direction, when said sliding member has been brought into a position corresponding to coupling engagement thereof with the other rotatable element, and temporary locking means for keeping said sliding member in fixed axial position with respect to said first mentioned rotatable element during the beginning of the displacement of said intermediate element from its neutral position.

6. A mechanical transmission device according to claim 5 further including synchronizing cooperative friction means carried by said sliding member and said second mentioned rotatable element respectively, the friction means carried by said sliding member being angularly fixed with respect thereto and axially slidable thereon, and means for temporarily bringing the friction means carried by said sliding member into contact with the friction means carried by the second mentioned rotatable element, operative by said intermediate element at the beginning of the displacement thereof from its neutral position before the second mentioned locking means of claim 5 have ceased to act.

7. In a mechanical transmission, a shaft, positive cooperating coupling elements one of which is slidable upon said shaft and has a clutched and an unclutched position, control means having a driving and a neutral position, an intermediate member operatively connecting said control means to said slidable element and axially movable relatively to said shaft and said slidable element, and releasable locking means cooperating with said shaft, with said slidable element and with said intermediate member for positively locking said slidable element to said shaft in said clutched position when said control means are in said driving position or within a limited determined distance therefrom, and in said unclutched position when said control means are in said neutral position or within a limited determined distance therefrom.

8. In a mechanical transmission, a shaft, a jaw clutch having two cooperating elements one of which is slidably mounted on said shaft and has a clutched and an unclutched position, control means having a driving and a neutral adjustment, an intermediate member operatively connecting said control means to said slidable element, and releasable means cooperating with said intermediate member for positively locking said slidable jaw clutch element to said shaft in said clutched position when said control means are in said driving adjustment or within a limited distance therefrom, in said unclutched position when said control means are in said neutral adjustment or within a limited distance therefrom, and for axially locking said slidable element to said intermediate member when said control means are in the interval comprised between said adjustments.

9. In a mechanical transmission, a shaft, cooperating coupling elements one of which is slidable upon said shaft and has a clutched and an unclutched position, an intermediate member non-rotatably mounted relative to said shaft and having a driving and a neutral adjustment, and releasable locking means controlled by said intermediate member and cooperating with said shaft and with said slidable coupling element for positively locking said slidable coupling element to said shaft in said clutched position when said intermediate member is in said driving adjustment and in said unclutched position when said intermediate member is in said neutral adjustment, and for axially interlocking said slidable element and said intermediate member when the latter occupies a position intermediary between its said adjustments.

10. In a mechanical transmission, a shaft, cooperating coupling elements one of which is slidable upon said shaft and has a clutched and an unclutched position, an intermediate member, releasable locking means cooperating with said shaft and having a driving and a neutral adjustment, with said slidable element and with said intermediate member for positively locking said slidable element to said shaft in said clutched position when said intermediate member is in said driving adjustment and in said unclutched position when said intermediate member is in said neutral adjustment, and for axially interlocking said slidable element and said intermediate member when the latter occupies a position intermediary between its said adjustments, said slidable element, said intermediate member and said locking means being non-rotatably mounted relative to said shaft.

11. In a mechanical transmission, a shaft, cooperating coupling elements one of which is slidable upon said shaft and has a clutched and an unclutched position, and releasable means for positively locking said slidable element to said shaft in said clutched and unclutched positions to prevent intempestive displacement of said slidable element, said releasable means being non-rotatably mounted relative to said shaft.

12. In a mechanical transmission, a shaft, cooperating positive coupling elements one of which is slidable upon said shaft and has a clutched and an unclutched position, an intermediate member having a driving and a neutral position, axially spaced first and second notches in said shaft, and releasable means coacting with said intermediate member and with said slidable element to engage said first or second notches to lock said slidable element positively to said shaft in said clutched or unclutched positions when said intermediate member is in said driving or neutral positions respectively.

13. In a mechanical transmission, a shaft, positive cooperating coupling elements one of which is slidable upon said shaft, control means, an intermediate member operatively connecting said control means to said slidable element and releasable means cooperating with said shaft, with said slidable element and with said intermediate member, for locking said slidable element to said shaft in coupled relation with the other coupling element, and synchronizing means disposed between said coupling elements.

14. In a mechanical transmission, a shaft, positive cooperating coupling elements one of which is slidable upon said shaft, control means, an intermediate member operatively connecting said control means to said slidable element, and releasable means cooperating with said shaft, with said slidable element and with said intermediate member and adapted for locking said slidable element to said shaft in coupled and uncoupled relations with the other coupling elements, and synchronizing means disposed between said coupling elements.

15. In a mechanical transmission, a shaft, positive cooperating coupling elements one of which is slidable upon said shaft and has an unclutched and a clutched position, control means having a neutral position, an intermediate member operably connecting said control means to said slidable element, and releasable locking means non-rotatably mounted relative to said shaft and cooperating with said shaft, with said slidable element and with said intermediate member for positively locking said slidable element to said shaft in said unclutched position when said control means are in said neutral position, and means cooperating with said releasable locking means whereby, in succession, said slidable element can be released from said shaft, axially interlocked with said intermediate member to be shifted by the latter into said clutched position and positively locked in said position by a continuous movement of said control means from their said neutral position.

FERDINANDO CARLO REGGIO.